J. M. HUDSON.
ADJUSTABLE DRAFT CONNECTION FOR HAMES.
APPLICATION FILED MAY 27, 1915.
1,188,450.  Patented June 27, 1916.
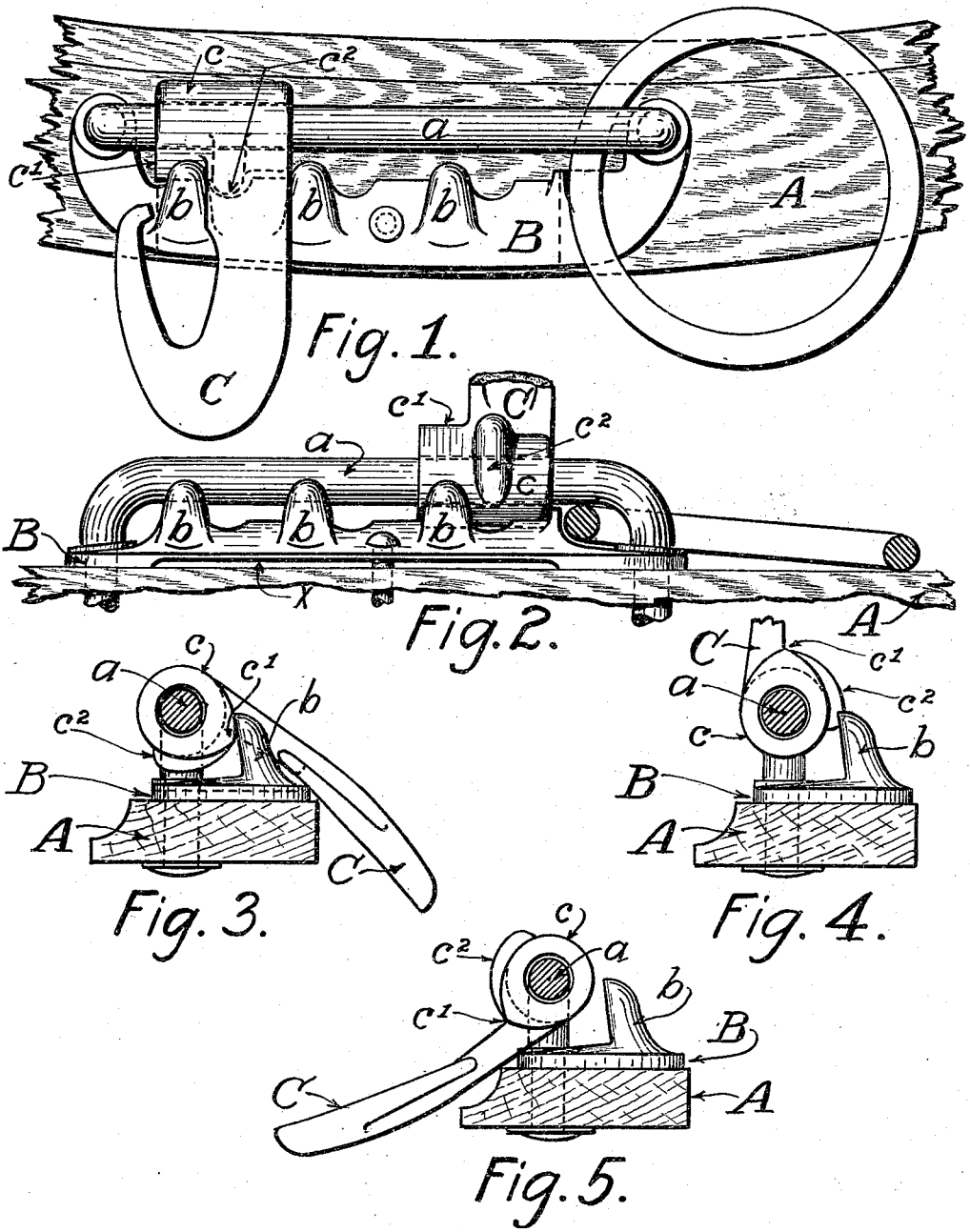

UNITED STATES PATENT OFFICE.

JAMES MONROE HUDSON, OF BLANCHESTER, OHIO.

ADJUSTABLE DRAFT CONNECTION FOR HAMES.

1,188,450.  Specification of Letters Patent.  Patented June 27, 1916.

Application filed May 27, 1915. Serial No. 30,800.

*To all whom it may concern:*

Be it known that I, JAMES MONROE HUDSON, a citizen of the United States, residing at Blanchester, in the county of Clinton and State of Ohio, have invented new and useful Improvements in Adjustable Draft Connections for Hames, of which the following is a specification.

My invention relates to adjustable draft connections for hames designed to accommodate the line of draft to the shoulder slope of the draft animal. The devices most generally used, embody in combination an elongated staple-bar with defined zones of engagement, a draft hook adjustably engaged thereon, and an independent spring arranged upon the face of the hame beneath the staple bar and bearing against the hook in frictional contact to aid in preventing accidental displacement and loss of hooks. The latter are usually detachable as a condition of adjustability. The independent spring usually employed is exposed to the weather and from use and exposure soon loses resiliency and is rendered useless and destroyed by rusting.

My invention is intended to remedy these and other defects and produce a simple and cheap draft-connection for hames which will more effectively prevent displacement and loss of hooks. It dispenses with the independent spring; and employs a plain staple bar, a (preferably) non-detachable hook slidable thereon, a side wear-plate formed with spur projections defining the zones of engagement for the hook upon the staple bar and also seating the hook securely in draft position. The engaging eye of the hook is extended at one side or edge of the hook and carries a radial extension giving an eccentric periphery, which extension contacts with the adjacent spur of the plate when the hook is rotated out of its draft position, causing a frictional resistance interposed by the spur and the elasticity of the plate of which it forms a part. The peripheral eccentricity of the eye being slight, the resistance, while relatively great, is quite within the normal resiliency of the parts and is more effective than that of an independent spring as ordinarily used in those devices and is permanent and unimpaired by use or exposure.

My invention is illustrated in the accompanying drawings, in which—

Figure 1 is a plan view of the device complete as in use; Fig. 2, a corresponding side elevation showing the hook turned back vertically to the face of the hame but still held against displacement by the quarter-rib upon the eye of the hook; and Figs. 3, 4 and 5 are detail end elevations from the left-hand of Fig. 1, sectioned through the staple bar, showing the draft hook first in its draft position (Fig. 3); in its intermediate position (Fig. 4); and in its reversed position for readjustment (Fig. 5).

Referring now to the drawings, A designates the hame; to which is fastened a plain two-pronged staple $a$, whose prongs pass through and secure to itself and the hame a plate B, formed as shown, to rest upon the face of the hame at one side of the staple and form a wear-plate for the draft-hook C, as indicated in Figs. 1 and 3.

The plate B is formed with projecting spurs $b$ extending upwardly at the side of the staple bar $a$ at each side of the hook C in its draft position, and thus define the zones of engagement of the draft hook upon the staple bar.

The draft hook C is formed with an "eye" portion $c$ projecting at one side of the hook proper as shown in Figs. 1 and 2; and at such portion the annulus is thickened to the form of a heart-shaped cam as shown at $c^1$. The function of this cam portion $c^1$ will be understood by comparing Figs. 3 and 4. When the draft hook is in its draft position the cam projection $c^1$ lies below and out of contact with the upper end of the plate-spur $b$, but with the adjacent peripheral surface of the eye in contact with the under surface of the spur which is correspondingly curved, as shown in Fig. 3. In turning backward the hook in relation to the hame, for readjustment on the staple bar, as indicated in Fig. 4, the cam point $c^1$ must pass the spur $b$ by contact displacement of the latter to which the material of the entire plate B offers an elastic resistance;—to which end the plate is preferably thinned through the greater part of its length as indicated at $x$, Fig. 2. A slight elastic action of the staple bar may also contribute to this function.

As an additional precaution against displacement, the eye part $c$ of the hook is provided with a rib $c^2$ extending a quarter way around from the back of the hook, which prevents lateral movement of the draft hook on the staple until it is turned approximately half a revolution backward from its draft position, as will be seen.

The mode of operation may be recapitulated as follows: To move the hook for readjustment on the staple bar it must be turned about half a revolution backward from its draft position, and it will then slide along the staple bar without obstruction. In its draft position, the hook C lies snugly between the projections $b$ of the plate B; and at intermediate points between ultimate positions the quarter rib $c^2$ prevents side movement. After adjustment and in turning the hook to draft position, just before reaching its proper radial relation for draft upon the staple bar, the cam-point $c^1$ again contacts with the adjacent spur $b$ and force is required to continue the rotation sufficient to overcome the resistance of the spur as part of the plate B. This resistance being elastic in a slight degree and distributed throughout the mass, is sufficient and unchangeable—the displacement being itself but slight. Thus an elasticity of the entire plate is availed of to prevent dislodgment of the hook from its draft position which is far more effective and unchangeable than that of a separate "spring," and the proper function is thus durably maintained.

At the lower end, the staple bar is extended a little for the engagement of the breast ring as is usual.

The cheapness and economy of the device in material and labor are obvious; and, as will also be evident, the staple bar is brought close to the face of the hame and the leverage of the draft action reduced to the minimum, and the draft on the staple is also minimized by the contact relation of the draft hook eye with the spurs when under draft.

I claim as my invention and desire to secure by Letters Patent of the United States—

1. In an adjustable draft connection for hames, an elongated staple bar; a plate, secured to the hame extending at one side of the bar and inclined upwardly toward the same, having a plurality of spur-extensions at its inner edge, in a line parallel with the side of the bar; and a draft hook having an eye formed with an eccentric cam-shaped periphery, adapted, when rotated upon the staple bar to contact at its point of greatest eccentricity with a contiguous spur of the side plate with frictional resistance.

2. In an adjustable draft connection for hames, the combination with an adjustable staple bar, of a draft hook having a shank terminating in an annulus adapting it to permanently engage and rotate upon said staple bar, said annulus being extended laterally at the side of the shank and formed with an eccentric periphery approximately in line with the underside of the hook.

3. In an adjustable draft connection of the character indicated, the combination with a staple bar, of a plate adapted to engage and be secured to the face of the hame at one side of the staple bar, and having a series of prongs extending from the inner edge of the plate at the side of and parallel with the staple bar, said prongs being at their inner sides eccentric to the circular periphery of the staple bar.

4. In an adjustable draft hame of the character indicated, in combination with a staple bar, a plate adapted to be secured to the hame parallel with the staple bar and present a raised edge contiguous thereto, said edge being provided at intervals with spurs defining the zones of engagement of the draft hook, and recessed at points between the spurs; and a draft hook provided with an eye adapting it to engage slidably upon the bar, and having an eccentric cam-shaped periphery adapting it to contact with a contiguous spur with frictional resistance when rotated away from draft position on the staple, said eye having also an independent concentric, partial rib adapting it to engage in the recesses of the plate to hold the cam of the eye in proper relation to contact with the spurs.

5. A draft hook for an adjustable draft device of the character indicated, consisting of a flat hook with shank and terminal annulus constituting an eye for engaging the staple bar, said annulus having an eccentric cam-shaped periphery at one side of the shank, and an independent concentric rib as shown.

In testimony whereof I have hereunto set my hand in presence of two subscribing witnesses.

JAMES MONROE HUDSON.

Witnesses:
 E. W. STRAWN,
 ANNA HUDSON.